United States Patent
Cauvain et al.

[11] 3,974,298
[45] Aug. 10, 1976

[54] TREATMENT OF GRAIN

[75] Inventors: Stanley Peter Cauvain, High Wycombe; Donald Gordon Hodge, Chesham; David Donald Muir, Rickmansworth; Norman James Harold Dodds, Chorleywood, all of England

[73] Assignee: Flour Milling and Baking Research Association, England

[22] Filed: Sept. 5, 1974

[21] Appl. No.: 503,310

[30] Foreign Application Priority Data
Sept. 7, 1973 United Kingdom............... 42264/73

[52] U.S. Cl............................. 426/553; 426/558; 426/622; 426/463; 426/464; 426/473; 426/520
[51] Int. Cl.² ......................................... A23B 4/04
[58] Field of Search ...................... 426/459–465, 426/473, 618, 622, 549, 551–553, 558, 496, 520

[56] References Cited
UNITED STATES PATENTS
3,490,917  1/1970  Doe .................................. 426/622

Primary Examiner—Norman Yudkoff
Assistant Examiner—Martin G. Mullen
Attorney, Agent, or Firm—Brisebois & Kruger

[57] ABSTRACT

Grain, (or a milling intermediate, e.g. semolina) is heated at a temperature of 100° to 140°C (or 100°–200°C for semolina) for a period inversely related to temperature and not less than 1 hour at 100°C, so as to improve the quality of cake flour produced by milling (or further milling). The time of heating $t$ (in minutes) is preferably related to the temperature $T$ (in °C) by the equation $t = a' - b'T + c'T^2$ where for wheat $a' = 2188$, $b' = 31.535$ and $c' = 0.11438$ and for semolina $a' = 408$, $b' = 4.252$ and $c' = 0.1121$. The need for chlorination of the flour produced is thus avoided.

9 Claims, 2 Drawing Figures

TREATMENT OF GRAIN

BACKGROUND OF THE INVENTION

1. Field of the Invention

This invention relates to a process for the treatment of grain or milling intermediates (for example, semolina) to be used in the production of cake flour, to the resultant wheat or intermediate and to the cakes, sponges and like products made from the resultant flour.

Cake flours are pale in colour and usually of fine granularity; they normally have a protein content of between 6% and 9% although for cakes containing dried fruit or cherries a flour having a protein content of up to 14% is often preferred. For some 40 years, however, it has been known that by using a flour which has been chlorinated, that is a flour that has been exposed to chlorine gas, cakes containing an increased ratio by weight of sugar to flour can be made. Such cakes can contain from 0.9 to 1.4 parts by weight of sugar to each 1 part by weight of flour and are referred to, in the flour-confectionery industry, simply as "high ratio" or "high sugar" cakes. The chlorinated flour is often referred to as "high ratio flour". If unchlorinated flour is substituted for chlorinated flour in a high ratio formula, the resultant cake is deficient in one or more desirable qualities; for example, it may collapse on leaving the oven or it may contain cores or streaks of a totally different consistency to the remainder of the crumb of the cake. The chlorination of flour has a number of chemical and physical effects; namely it denatures some of the proteins, bleaches the pigments and may effect the starch and such water-soluble components as proteins and pentosans. The nature of these effects is not fully understood.

Although the chlorination of flour for the purpose of cake-making has not been shown to be a hazard to health, some countries, including most of those within the European Economic Community, avoid its use. In Great Britain, however, it is commercially important and its discontinuance, for whatever reason, would be a source of considerable difficulty for the flour-confectionery industry.

2. Description of the Prior Art

It has been proposed, inter alia in United Kingdom Patent Specification No. 1,110,711 to heat cake flour in order to produce a flour which does not require chlorination.

An alternative treatment has now been found by which flour suitable as a replacement for chlorinated flour can be produced.

Moderate heat treatment of wheat at temperatures of about 50° to 80°C has long been known to have mild effects on the wheat protein which give an improvement in the bread-making properties of the flour. The treatment now proposed consists of heating the wheat, or the intermediate, at a higher temperature in order to improve the cake-making properties of the flour milled from it.

SUMMARY OF THE INVENTION

The description which follows relates to the treatment of whole wheat and semolina, but the invention may also be applied to other millable substances, such as whole grains, scoured grains or milling intermediates, though the processing conditions may be different from those described for the whole wheat.

The invention essentially comprises heating whole grain or a milling intermediate, suitable for the production of cake flour, which has been dried previously by any means to a moisture content of 6% or less, at a temperature of from 100°C to 140°C in the case of whole grain, or from 100° to 200°C in the case of milling intermediates, holding it at this temperature for a sufficient time and then cooling it or allowing it to cool to below 100°C.

The recommended duration of heating depends upon the temperature at which the wheat is heated and the relationship between the time and temperature may be expressed by an equation of the form:

$$t = a - bT + cT^2$$

where
 $T$ = temperature in °C
 $t$ = time in minutes
 $a, b, c$ are constants.

For the minimum time of heating to achieve the desired effect the constants in the above equation have the values:
 $a = 535$,
 $b = 7.253$,
 $c = 0.02501$.

This means that at 100°C, for example, the minimum period of heating required is 1 hour; at 120°C the minimum time is 25 minutes and at 140°C the minimum time is 10 minutes. It is advantageous to subject the wheat to longer heating times than those indicated by the aforesaid equation provided that these are not so long as to induce a cooked flavour in the wheat or flour milled therefrom. For the preferred time of heating to fully achieve the desired effect, the constants in the above equation have the values:
 $a = 2188$,
 $b = 31.533$,
 $c = 0.11438$.

This means that at a temperature of 100°C the wheat should preferably be heated for a period of 3 hours; at 120°C for 51 minutes and at 140°C for 15 minutes.

In the case of whole grain the use of higher temperatures is limited by the development of a cooked flavour in the wheat or flour milled therefrom. In the case of semolina, however, heating temperatures of from 100° to 200°C may be used as aforesaid. The relationship between time of heating and temperature is again expressed by an equation of the form given above. In this case, for the minimum time of heating required to achieve the desired effect, the constants have the values:
 $a = 275$,
 $b = 2.858$,
 $c = 0.00752$.

For the preferred time of heating, the constants have the values:
 $a = 408$,
 $b = 4.252$,
 $c = 0.01121$.

This means that at 200°C, for example, the minimum time of heating required is 4 minutes and the preferred time is 6 minutes.

After heating, the wheat or milling intermediate should be cooled, or allowed to cool, as quickly as possible.

BRIEF DESCRIPTION OF THE DRAWING

The drawings, comprising

DESCRIPTION OF THE PREFERRED EMBODIMENTS

Figure 1:
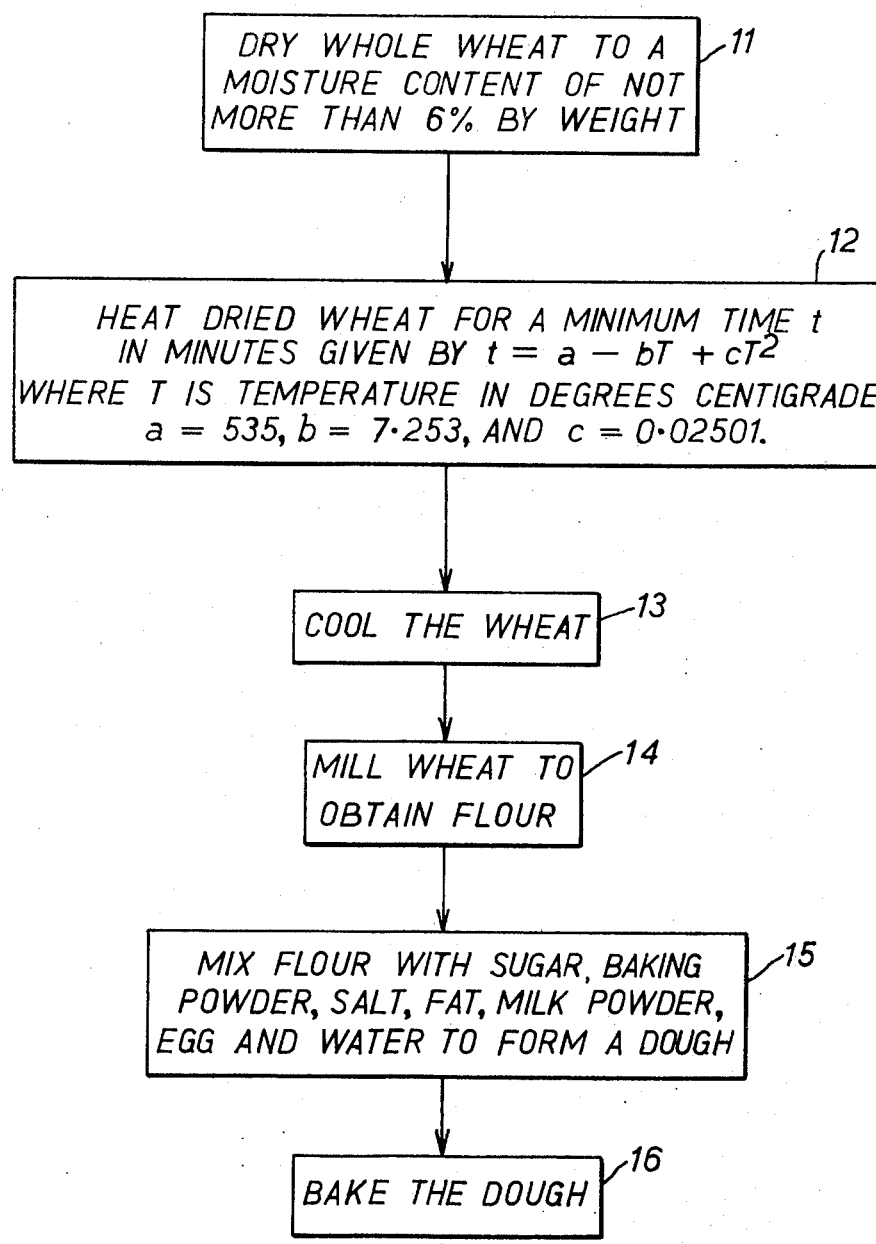
FIGS. 1 and 2, are flow diagrams illustrating two embodiments of methods in accordance with the invention.

FIG. 1 of the drawings illustrates an embodiment of the invention by which improved cake flour, not requiring chlorination, is prepared from whole wheat and formed into a cake.

In a first step 11 the whole wheat is dried, using any convenient known drying apparatus, to a moisture content not exceeding 6% by weight. In a second step 12 the dried whole wheat is heated at 100° – 140°C for a minimum time $t$ in minutes given by $t = a - bT + cT^2$, where $T$ is the temperature in °C at which the wheat is heated, $a = 535$, $b = 7.253$ and $c = 0.22501$. In a third step 13 the heated wheat is allowed to cool and in a fourth step 14 the wheat is milled in known manner to a cake flour. In a fifth step 15 the cake flour is mixed with conventional ingredients, specifically sugar, salt, baking powder, fat, milk powder, egg and water to form a dough and in a sixth step 16 the dough is baked to cook the cake.

Figure 2:
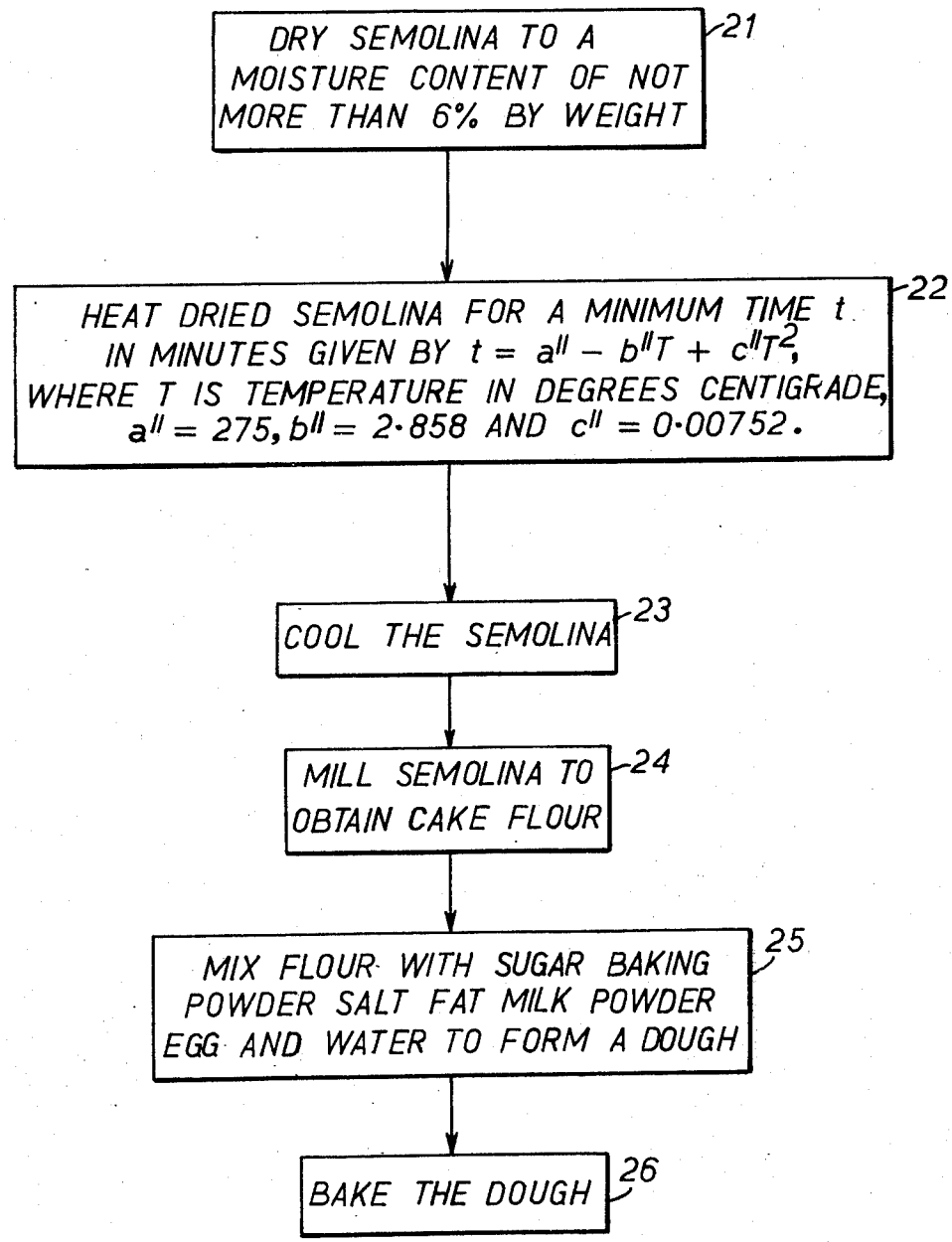

FIG. 2 of the drawings illustrates an embodiment of the invention in which improved cake flour is prepared from a milling intermediate semolina, and is formed into a cake.

In a first step 21, the semolina is dried to a moisture content of not more than 6% by weight, in a second step 22 the dried semolina is heated at 100° – 200°C for a minimum time $t$ in minutes given by $t = a'' - b''T + c''T^2$, where $T$ is the temperature in °C at which the semolina is heated, $a'' = 275$, $b'' = 2.858$ and $c'' = 0.00752$. In a third step 23 the heated semolina is allowed to cool, in a fourth step 24 the cooled semolina is further milled to a cake flour, in a fifth step 25 the flour is mixed with the conventional ingredients to form a cake dough and in a sixth step 26 the dough is baked into a cake.

The aforesaid equations for wheat and for milling intermediates define the recommended zone of operation within which the heat treatment is beneficial. At any temperature within the defined ranges, heating of the wheat, or milling intermediate, for a longer period than that preferred may effect further improvement in its subsequent cake-making properties but there is an increasing risk of the development of a cooked flavour in the wheat, or milling intermediate, or flour milled therefrom, as the time of heating is increased beyond the preferred time.

Operation of the process at lower temperatures or for shorter times than specified, or the use of wheat or milling intermediate with a moisture content in excess of 6%, may effect a partial alteration in the resultant flour such that it may be used with an increased proportion of sugar in some types of cake, but such alteration will not allow it to replace correctly chlorinated flour in many high-ratio recipes.

Heating of the wheat or milling intermediate may be carried out in many ways, of which the following may be mentioned by way of example:

1. heating in a rotating drum, either batchwise or continuously,
2. heating in a continuous screw-conveyor of which the screw or the jacket or the screw and jacket may be heated,
3. heating in a static or travelling oven provided with means for circulating air,
4. heating in a hot-air fluidised bed,
5. heating by microwaves, or other high frequency radiation,
6. heating by infra-red radiation,
7. heating in a commercial grain drier,
8. heating in a spouted bed drier.

If so desired, for reasons of convenience, the drying process may immediately precede and be contiguous with the heating process, but the drying process does not form part of the invention.

After heating the wheat will be at a low moisture content and for normal milling practice it should be conditioned to a moisture content of between 11% and 17% but the moisture content of the wheat as it enters the roller mill does not form part of the invention.

To reach the desired moisture content, that is to condition it for milling, the required water may be added in any convenient manner. The usual conditioning equipment may be used or the heat-treated wheat, with or without cooling, may be plunged directly into water from which it is subsequently separated and conditioned in the normal manner to obtain a desirable moisture content prior to milling.

This wheat may be milled in a conventional flour mill in the same way as cake flours produced in a normal manner. The final flour should preferably have an average particle size by weight of less than 32 microns; if necessary its particle size may be reduced by use of a pinned-disc mill or by the other means; the flour may subsequently be subjected to an air-classification process if desired.

The flour obtained may be used in high ratio cake recipes to replace flour chlorinated after being milled in the same way from unheated wheat.

In order that the invention may be more fully understood, the following examples are given by way of illustration only:

EXAMPLE 1

English-grown wheat at a moisture content of 13.7% was dried to 5.8% moisture by means of hot air at 40°–50°C passing through a vertical drier containing a revolving paddle. One kilo of the wheat was placed in a thin layer on an aluminum tray and passed through a forced-draught travelling oven, with an air-temperature of 100°C, for exposure times of 30 minutes (a), 60 minutes (b), 120 minutes (c). The wheat was allowed to cool under ambient conditions and was subsequently placed in a moisture-tight tin with sufficient water to bring its moisture content to 15%.

After this treatment it was milled in a laboratory roller mill, and passed twice through a laboratory-scale pin mill to reduce the flour particle size such that over 90% by weight of the flour passed through a 32μ sieve in an air-jet sifter.

A further sample of wheat was dried to 5.8% moisture as described above and then conditioned to 15% moisture. The wheat was milled and the flour pin-milled as above, a portion of this flour was chlorinated at the rate of 8 ozs of chlorine per 280 lb (d) and the remainder was used for the baking tests in the untreated condition (e).

using the above flour cakes were baked with the following formula:

| | |
|---|---|
| Flour | 100 g |
| Caster sugar | 130 g |
| Baking powder | 5 g |
| Salt | 2.5 g |
| "High ratio" fat | 75 g |
| Skim milk powder | 8 g |
| Whole egg | 75 g |
| Water | 77 g |

The untreated flour (e) gave a cake of small volume, collapsed appearance and of very pasty eating quality.

The chlorinated flour (d) gave a cake of good volume, well risen appearance and good eating quality.

The heated wheat flour (a) gave a cake of slightly better volume and appearance than (e) but still with pasty eating qualities.

The heated wheat flour (b) produced by treating the wheat in accordance with the invention gave a cake of comparable volume and appearance to (d) but crumb colour was slightly darker and of very slightly pasty eating quality.

The heated wheat flour (c) also produced by treating the wheat in accordance with the invention gave a cake of comparable volume and appearance to (d), with good volume, appearance and eating quality, but crumb colour was slightly darker.

EXAMPLE 2

In this example, wheat was dried to 5.8% in the same manner as described in Example 1. It was subsequently heated in an oven, as in Example 1, with an air temperature of 140°C for 10 minutes (a), 15 minutes (b) and 20 minutes (c). On removal from the oven the wheat was allowed to cool under ambient conditions when its temperature fell to less than 100°C in 6 minutes. It was then treated as described in Example 1. A chlorinated flour (d) and an untreated flour (e) were derived from the dried wheat as Example 1. All the flours were baked into cakes as in Example 1.

The chlorinated flour (d) and the untreated flour (e) gave cakes as described in Example 1.

The heated wheat flour (a) gave cakes of similar appearance to (d) but with slightly pasty eating quality.

The heated wheat flour (b) produced by treating the wheat in accordance with the invention gave cakes comparable with the chlorinated flour in volume, appearance and eating quality but of slightly darker crumb colour.

The heated wheat flour (c) also produced by treating the wheat in accordance with the invention gave cakes similar to (b) but with a slightly cooked or toasted flavour and a slightly darker crumb colour.

EXAMPLE 3

½ kilo of semolina, a milling intermediate, was heated in an oven, as in Example 1, with an air temperature of 200°C. In this example the drying process was carried out immediately prior to the heating process, a time of 3 minutes with an air temperature of 200°C being necessary to reduce the moisture content of the semolina to less than 6% moisture. After reaching a moisture content of less than 6% samples of semolina were heated with an air temperature of 200°C for 3 minutes (a), 5 minutes (b) and 7 minutes (c). After heating the semolina was allowed to cool under ambient conditions when its temperature fell to less than 100°C in 4 minutes. It was then re-humidified to a moisture content of 13% by exposure to moist air. The semolina was then passed through a laboratory pin-mill and the resulting material sieved on a No. 10 silk screen, (aperture 0.14 mm), the 'flour' passing through the silk was then passed through the laboratory pin-mill twice more to achieve the optimum particle size.

Further, unheated samples of semolina were subjected to the same sequence of pin-milling, sieving and pin-milling as described above; a portion of the resultant flour was treated with 8 ozs of chlorine per 280 lbs of flour (d) and the remainder was used in the untreated form (e).

The samples were baked into cakes using the formula in Example 1.

The untreated sample (e) gave cakes of small volume, sunken appearance and pasty eating qualities.

The chlorinated sample (d) gave cakes of good volume and appearance with good eating qualities.

The heated sample (a) produced cakes with better volume than (e) but with a slightly sunken appearance and slightly pasty eating qualities.

The heated sample (b) prepared by treating the semolina in accordance with the invention gave cakes of volume, appearance and eating qualities similar to (d) but with a slightly darker crumb colour.

The heated sample (c) also prepared by treating the semolina in accordance with the invention gave cakes of similar quality to (b) but with a slightly cooked or toasted flavour.

EXAMPLE 4

English wheat was dried in the same manner as described in Example 1, the dried wheat was then heated in an oven with an air temperature of 100°C for a time of 120 minutes (a) as in Example 1. Samples of chlorinated flour (b) and untreated flour (c) were also prepared as in Example 1. The flours were baked into sponge cakes using the following formula:

| | |
|---|---|
| Flour | 100 g |
| Sugar | 105 g |
| Liquid egg | 60 g |
| Skim milk powder | 8 g |
| Groundnut oil | 15 g |
| Salt | 1 g |
| Baking powder | 5 g |
| Water | 50 g |
| Emulsifier (G.M.S.) (Commercial distilled monoglyceride) | 2.6 g |

The untreated flour (c) produced cakes of low volume, poor external appearance with a soft crumb and pasty eating quality.

The chlorinated flour (b) produced cakes of good volume and external appearance with a fine even crumb and good eating quality.

The heated wheat flour (c) prepared from wheat treated in accordance with the invention produced cakes of comparable volume, appearance and crumb structure to (b) but a slightly darker crumb colour and slightly softer eating quality.

It will thus be seen that by the use of the invention unchlorinated cake flours may be produced which yield results comparable with chlorinated flours.

What we claim is:

1. Process for the treatment of a wheat product in the form of whole wheat grains or an intermediate substance produced during the milling of wheat grains to obtain cake flour which process comprises the steps of drying said wheat product to a moisture content of 6% by weight or less, heating the dried wheat product at a temperature of from 100° to 140°C in the case of whole grains or from 100° to 200°C in the case of milling intermediates, holding the wheat product at this temperature at least for a period which is inversely related to the temperature and is not less than 1 hour at 100°C, and cooling the wheat product.

2. A process in accordance with claim 1 for the treatment of whole wheat wherein the minimum duration of heating time in minutes $t$ is given by the equation $$t = a - bT + cT^2$$

where $T$ denotes the temperature in °C, $a = 535$, $b = 7.253$ and $c = 0.02501$.

3. A process in accordance with claim 1 for the treatment of whole wheat wherein the heating time $t'$ in minutes is given by the equation:

$$t' = a' - b'T + c'T^2$$

where $T$ denotes temperature in °C, $a' = 2188$, $b' = 31.533$ and $c' = 0.11438$.

4. A process in accordance with claim 1 for the treatment of semolina wherein the minimum heating time $t''$ in minutes is given by the equation:

$$t'' = a'' - b''T + c''T^2$$

where $T$ denotes temperature in °C, $t'' = 275$, $b'' = 2.858$ and $c'' = 0.00752$.

5. A process in accordance with claim 1 for the treatment of semolina wherein the heating time $t^*$ in minutes is given by the equation:

$$t = a - bT + cT^2$$

where $T$ denotes temperature in °C, $a = 408$, $b = 4.252$ and $c = 0.1121$.

6. A method of preparing cake flour which comprises treating whole grain by a process in accordance with claim 1, milling said grain to produce flour and pin-milling said flour so that over 90% thereof passed through a 32$\mu$ sieve.

7. A method of preparing cake flour which comprises milling grain to produce semolina, treating said semolina by a process in accordance with claim 1, re-humidifying the semolina and preparing flour from said semolina.

8. A method of making a cake which comprises treating whole grain by a process in accordance with claim 1, milling said grain to produce flour, mixing the resultant flour with sugar, baking powder, salt, fat, milk powder, egg and water to form a dough and baking the dough thus formed.

9. A method of making a cake which comprises treating semolina by a process in accordance with claim 1, re-humidifying the semolina, preparing flour from said re-humidified semolina, mixing the resultant flour with sugar, baking powder, salt, fat, milk powder, egg and water to form a dough and baking the dough thus formed.

* * * * *